March 13, 1951　　　J. A. PARKES　　　2,544,764
PUMP CONNECTOR
Filed Dec. 15, 1948

INVENTOR
James Arnold Parkes.
BY Lucke + Lucke
AGENTS

Patented Mar. 13, 1951

2,544,764

UNITED STATES PATENT OFFICE 2,544,764

PUMP CONNECTOR

James Arnold Parkes, Birmingham, England

Application December 15, 1948, Serial No. 65,495
In Great Britain December 31, 1947

4 Claims. (Cl. 285—165)

This invention relates to connectors for connecting a length of flexible or other tube to the end of a hollow spigot or other tubular member, such as a tyre valve, or the nozzle of a water, gas or other supply pipe. The invention is applicable to connectors intended for use as aforesaid which are of the kind comprising a hollow body provided at one end with a hollow shank for connecting the body to the length of flexible or other tube, the body being provided internally with a compressible sleeve having an internal diameter such as to enable it to be passed over the end of the tubular member referred to, the arrangement being such that the sleeve can be compressed axially so as to make it contract in a radial direction and grip the end of the tubular member referred to.

The object of the present invention is to provide an improved and simplified construction.

According to the invention, a screw may be provided for applying pressure to the sleeve so as to compress it axially and contract it radially, the hollow shank extending axially through the screw and having its outer end projecting beyond the screw and adapted for connection to the flexible or other tube, the inner end of the shank being provided with a washer adapted to engage with one end of the sleeve, the opposite end of which is engaged by the hollow body, said washer being adapted to be engaged by the inner end of the screw when this is turned in one direction so as to apply pressure to the rubber sleeve.

The invention is illustrated in the accompanying drawings, wherein.

Figure 1:
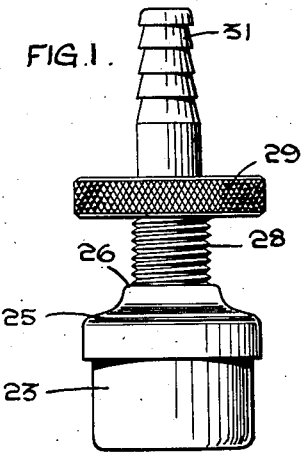
Figure 1 is a side elevation of another form of connector.
Figure 2:
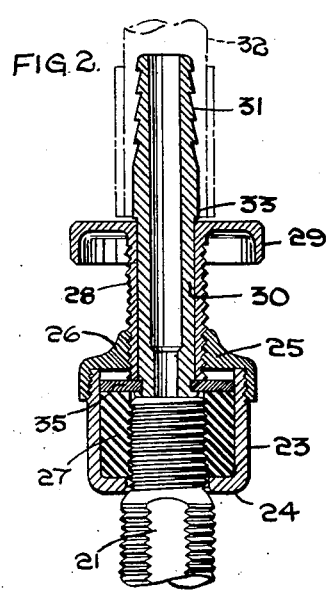
Figure 2 is a sectional view of the connector in Figure 1.

Referring to the construction shown in Figures 1 and 2 of the drawings, the connector comprises a hollow body made in two parts one of which, a cylindrical part 23, is threaded externally at one end and provided at its outer end with an inwardly-directed centrally-apertured flange 24. The other part of the body is in the form of a cap 25 which screws on to the exterior of the threaded portion of the cylindrical part 23 and is provided with a tubular axial extension 26 which is threaded internally.

The rubber sleeve 27 which is to be contracted on to the nozzle 21 of the tyre valve is of cylindrical form and of external diameter corresponding to the internal diameter of the body part 23, and is placed within the body with one end of the sleeve in engagement with the flange 24.

In threaded engagement with the interior of the extension 26 of the cap 25 is a hollow screw 28 provided with a knurled operating portion 29, and freely mounted within this hollow screw so that the latter can rotate around it is the hollow shank member 30, the outer end 31 of which projects beyond the outer end of the screw and is adapted for connection within one end of a length of flexible hose 32, the other end of which is connected to the tyre inflator.

Intermediate its ends the hollow shank member is formed with a peripheral flange 33 which serves to retain the screw against axial movement in a direction outwardly of the shank member, while at its inner end the shank member is formed with an axially-extending part 34 of reduced section which projects beyond the inner end of the screw 28 and has fixedly attached thereto a disc-like washer 35 the inner face of which engages with the adjacent face of the rubber sleeve 23.

In operation the body part 23 of the connector is pushed over the nozzle 21 of the tyre valve so as to slide the rubber sleeve 27 over the end of the nozzle. The screw 28 is now turned by operating the part 29 thereon so that the washer 35 presses against the adjacent end of the sleeve 27, thereby compressing the sleeve in an axial direction and causing it to contract in a substantially radial direction on to the exterior of the nozzle 21 and effect airtight engagement therewith.

During the tightening operation the screw rotates around the hollow shank member 30, displacing the shank member axially in relation to the hollow body by reason of the mounting of the washer 35 on the inner end of the shank member.

When the screw is turned in the opposite direction its outer end engages with the flange 33 on the periphery of the hollow shank member, thereby displacing the latter together with the washer 35 in the reverse direction and relieving the pressure on the rubber sleeve 27.

Figure 4:
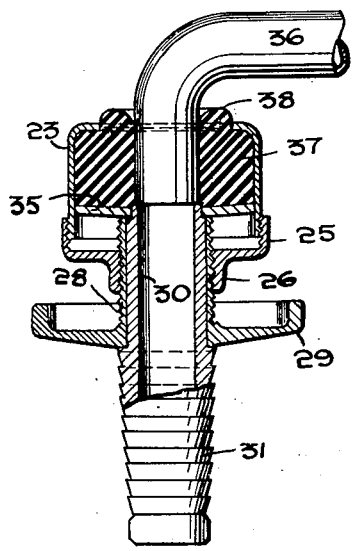
Figure 4 is a view similar to Figure 3 showing the same connection but with the sleeve turned inside out and the connector mounted on a tap of smaller diameter.
Figure 3:
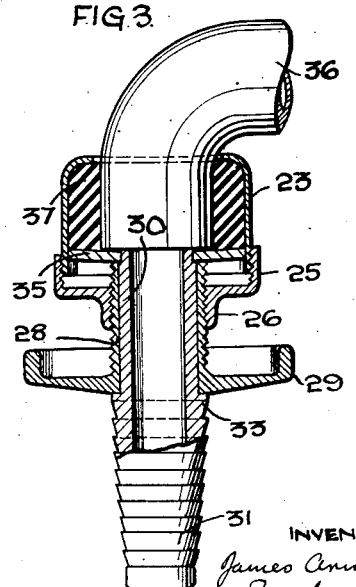
Figure 3 is a cross-sectional view of another construction adapted for use with a water tap.

The modified construction depicted in Figures 3 and 4 is constructed generally similar to that shown in Figures 1 and 2, but is intended for connecting one end of a flexible hose, not shown in the drawings, to the outlet orifice or nozzle 36 of a domestic water tap. The rubber sleeve 37 which is used in this construction is shown in Figure 5, partly in section, and is of cylindrical formation with a cross section which provides an upper edge 38 which is curved to approximately semi-circular form.

The manner in which the sleeve 37 can be adapted to fit outlet nozzles of two substantially different diameters with the same connector is illustrated in Figures 3 and 4 and Figures 5 and 6, where the nozzle 36 of Figure 4 is substantially less in diameter than the nozzle of Figure 3.

Figure 5:
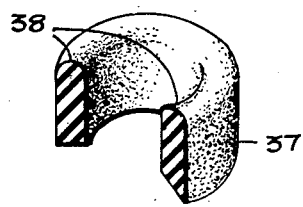
Figures 5 and 6 are views partly in section showing the sleeve as used in Figures 3 and 4 respectively.
Figure 6:
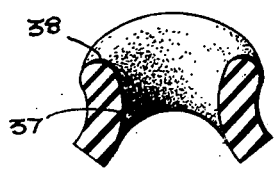

When the sleeve 37 is turned inside out, as in Figure 6, it will be seen that, owing to the difference between its internal and external diameters in the original form, Figure 5, it has now become distorted to the form of Figure 6 and is under stress inwardly in a radial direction so that the sleeve will now more readily grip a nozzle of substantially smaller diameter.

When the sleeve in this state is fitted to the nozzle 36 and the connector is screwed up the upper edge portion 38 is bulged out through the aperture between flange 24 and nozzle 36 so as to make a watertight connection with the nozzle. It should however be understood that it is only necessary to turn the sleeve 37 inside out with the construction shown in Figures 3 and 6, where the outlet orifices are of substantially differing diameters. If the difference in diameter is relatively small the same connector can be employed without the sleeve being turned inside out and fitted with ease on the outlet orifice.

Each form of connector above described possesses the advantage that the shank member is in line with the rubber sleeve which is mounted within the hollow body so that the operation of forming the connector is simple and inexpensive.

What I claim then is:

1. A connector of the kind described comprising a hollow body of cylindrical form, an axially-compressible sleeve arranged within the hollow body, a screw extending axially of the body engaging a screw threaded part of the body and adapted to be operated to apply pressure to said sleeve to compress it axially, and a hollow shank extending axially through the screw and having its outer end projecting beyond the screw, the inner end of the shank being provided with a washer adapted to engage one end of the sleeve, the opposite end of which is engaged by the hollow body, said washer being also adapted to be engaged by the inner end of the screw when this is turned so as to apply pressure to the sleeve.

2. A connector according to claim 1, further characterised in that a peripheral flange is provided on the hollow shank intermediate its ends, said flange being adapted to engage with the outer end of the screw to retain the screw in position within the body and to ensure that the washer on the shank is displaced when the screw is turned in a direction to relieve the pressure.

3. A connector of the kind described comprising a hollow body of cylindrical form, an axially compressible sleeve arranged within the hollow body, one end of said sleeve engaging one end of the hollow body and the outside of the sleeve engaging the inside of the body, a screw extending axially of the body engaging a screw threaded part of the body and adapted to be operated to apply pressure to said sleeve to compress it axially, a hollow shank extending axially through the screw and having its outer end projecting beyond the screw and a washer on the inner end of the shank engaging the other end of said sleeve, said washer being engaged by the inner end of the screw when this is turned so as to apply pressure to the sleeve.

4. A connector of the kind described comprising a hollow body of cylindrical form having an inwardly directed apertured flange at one end, a rubber sleeve within the hollow body, one end of said sleeve engaging said flange, the other end of the hollow body having a removable cap, a screw extending axially of the body through said cap engaging a screw thread on said cap, an operating flange on said screw outside the body and spaced therefrom, the screw being adapted to be operated to apply pressure to said sleeve to compress it axially, a hollow shank extending axially through the screw and having its outer end projecting beyond the screw and a washer on the inner end of the shank engaging the other end of said sleeve, said washer being engaged by the inner end of the screw when this is turned so as to apply pressure to the sleeve.

JAMES ARNOLD PARKES.

REFERENCES CITED

The following references are of record in the file of this patent:

FOREIGN PATENTS

| Number | Country | Date |
|--------|---------|------|
| 638,612 | France | Feb. 21, 1928 |
| 292,819 | Great Britain | June 28, 1928 |